United States Patent
Tsuda

(10) Patent No.: US 11,254,233 B2
(45) Date of Patent: Feb. 22, 2022

(54) CHARGE-DISCHARGE MANAGEMENT SYSTEM

(71) Applicant: TOYOTA JIDOSHA KABUSHIKI KAISHA, Toyota (JP)

(72) Inventor: Satoshi Tsuda, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 98 days.

(21) Appl. No.: 16/808,873

(22) Filed: Mar. 4, 2020

(65) Prior Publication Data

US 2020/0307410 A1 Oct. 1, 2020

(30) Foreign Application Priority Data

Mar. 26, 2019 (JP) .............................. JP2019-058228

(51) Int. Cl.
*B60L 55/00* (2019.01)
*H02J 7/00* (2006.01)
(Continued)

(52) U.S. Cl.
CPC ................ *B60L 55/00* (2019.02); *B60L 53/14* (2019.02); *B60L 53/53* (2019.02); *G06Q 50/06* (2013.01); *H02J 7/007* (2013.01); *B60K 1/04* (2013.01); *B60K 6/28* (2013.01); *B60Y 2200/91* (2013.01); *B60Y 2200/92* (2013.01); *B60Y 2300/91* (2013.01)

(58) Field of Classification Search
CPC .......... B60L 55/00; B60L 53/14; B60L 53/53; H02J 7/00; G06Q 50/06

USPC ......................................................... 320/128
See application file for complete search history.

(56) References Cited

U.S. PATENT DOCUMENTS 6,380,637 B1 * 4/2002 Hsu et al. ............... B60L 1/006
                                                             290/1 R
7,880,442 B2 * 2/2011 Takeuchi .............. H01M 10/44
                                                             320/157

(Continued)

FOREIGN PATENT DOCUMENTS

| JP | 2010-081722 A | 4/2010 |
| JP | 2010-110173 A | 5/2010 |
| JP | 2015-171188 A | 9/2015 |

*Primary Examiner* — Sun J Lin
(74) *Attorney, Agent, or Firm* — Oliff PLC

(57) ABSTRACT

A charge-discharge management system according to the present disclosure includes a plurality of electric vehicles wherein each electric vehicle has a storage battery, a charge-discharge facility that charges and discharges the storage batteries of the plurality of electric vehicles, and a charge-discharge management device that controls charging and discharging actions of the charge-discharge facility. Each electric vehicle of the plurality of electric vehicles is configured to exchange electricity of the storage battery of the electric vehicle of the plurality of electric vehicles by another electric vehicle through the charge-discharge facility. The charge-discharge management device switches, according to an electricity buying price, a charging action between an action of charging the storage batteries of the plurality of electric vehicles by the charge-discharge facility and an action of charging the storage batteries of the plurality of electric vehicles by exchanging electricity of the storage batteries between the plurality of electric vehicles.

3 Claims, 4 Drawing Sheets

(51) Int. Cl.
    *B60L 53/14*     (2019.01)
    *B60L 53/53*     (2019.01)
    *G06Q 50/06*     (2012.01)
    *B60K 1/04*     (2019.01)
    *B60K 6/28*     (2007.10)

(56) References Cited

U.S. PATENT DOCUMENTS

| | | | |
|---|---|---|---|
| 8,581,555 B2 * | 11/2013 | Yamamoto et al. | H01M 10/441 320/134 |
| 8,725,331 B2 * | 5/2014 | Yoshida | B60L 55/00 701/22 |
| 9,484,741 B2 * | 11/2016 | Hernandez et al. | H02J 1/08 |
| 9,646,334 B2 * | 5/2017 | Ishida | G06Q 30/0283 |
| 9,654,005 B2 * | 5/2017 | Deng | H02J 7/02 |
| 9,906,059 B2 * | 2/2018 | Hang et al. | H02J 7/0068 |
| 10,406,927 B2 * | 9/2019 | Baba | H02J 3/381 |
| 10,913,371 B2 * | 2/2021 | Baba | H02J 3/38 |
| 2010/0076825 A1 | 3/2010 | Sato et al. | |
| 2013/0063074 A1 * | 3/2013 | Lin et al. | H02J 7/00047 320/107 |

\* cited by examiner

CHARGE-DISCHARGE MANAGEMENT SYSTEM

INCORPORATION BY REFERENCE

The disclosure of Japanese Patent Application No. 2019-058228 filed on Mar. 26, 2019 including the specification, drawings and abstract is incorporated herein by reference in its entirety.

BACKGROUND

1. Technical Field

The present disclosure relates to a charge-discharge management system that manages charging and discharging actions of a plurality of storage batteries.

2. Description of Related Art

Japanese Patent Application Publication No. 2010-81722 (JP 2010-81722 A) describes a charge-discharge management device that creates and implements a charge schedule of an electric vehicle up to the time when the electric vehicle is used, so as to maximize the profit of the consumer.

SUMMARY

The charge-discharge management device described in JP 2010-81722 A does not take into account the profit of a consumer in a case where a plurality of electric vehicles is connected to a charge-discharge facility. Therefore, it has been hoped that a technology would become available that aims to increase the profit of a consumer who owns (or manages) a plurality of electric vehicles in a charge-discharge facility retaining those electric vehicles.

The present disclosure has been contrived in view of this problem, and an object thereof is to provide a charge-discharge management system that can increase the profit of a consumer.

A charge-discharge management system according to the present disclosure includes a plurality of electric vehicles each having a storage battery, a charge-discharge facility that charges and discharges the storage batteries, and a charge-discharge management device that controls charging and discharging actions of the charge-discharge facility. Each of the electric vehicles is configured to be able to exchange electricity of the storage battery with another electric vehicle through the charge-discharge facility. The charge-discharge management device switches, according to an electricity buying price, a charging action of the storage batteries between an action of charging the storage batteries by the charge-discharge facility and an action of charging the storage batteries by exchanging the electricity of the storage batteries between the electric vehicles.

In the charge-discharge management system according to the present disclosure, the charge-discharge management device may discharge electricity of the storage batteries to an electric power system by controlling the charge-discharge facility according to an electricity buying price and/or an electricity selling price. This configuration can further increase the profit of the consumer, for example, by discharging the electricity of the storage batteries to the electric power system when the electricity selling price is high.

The charge-discharge management system according to the present disclosure switches, according to an electricity buying price, the charging action of the storage batteries between the action of charging the storage batteries by the charge-discharge facility and the action of charging the storage batteries by exchanging electricity of the storage batteries between the electric vehicles. Thus, this system can increase the profit of the consumer.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The configuration and operation of a charge-discharge management system that is an embodiment of the present disclosure will be described below with reference to the drawings.

Configuration

First, the configuration of the charge-discharge management system that is an embodiment of the present disclosure will be described with reference to FIG. 1.

Figure 1:
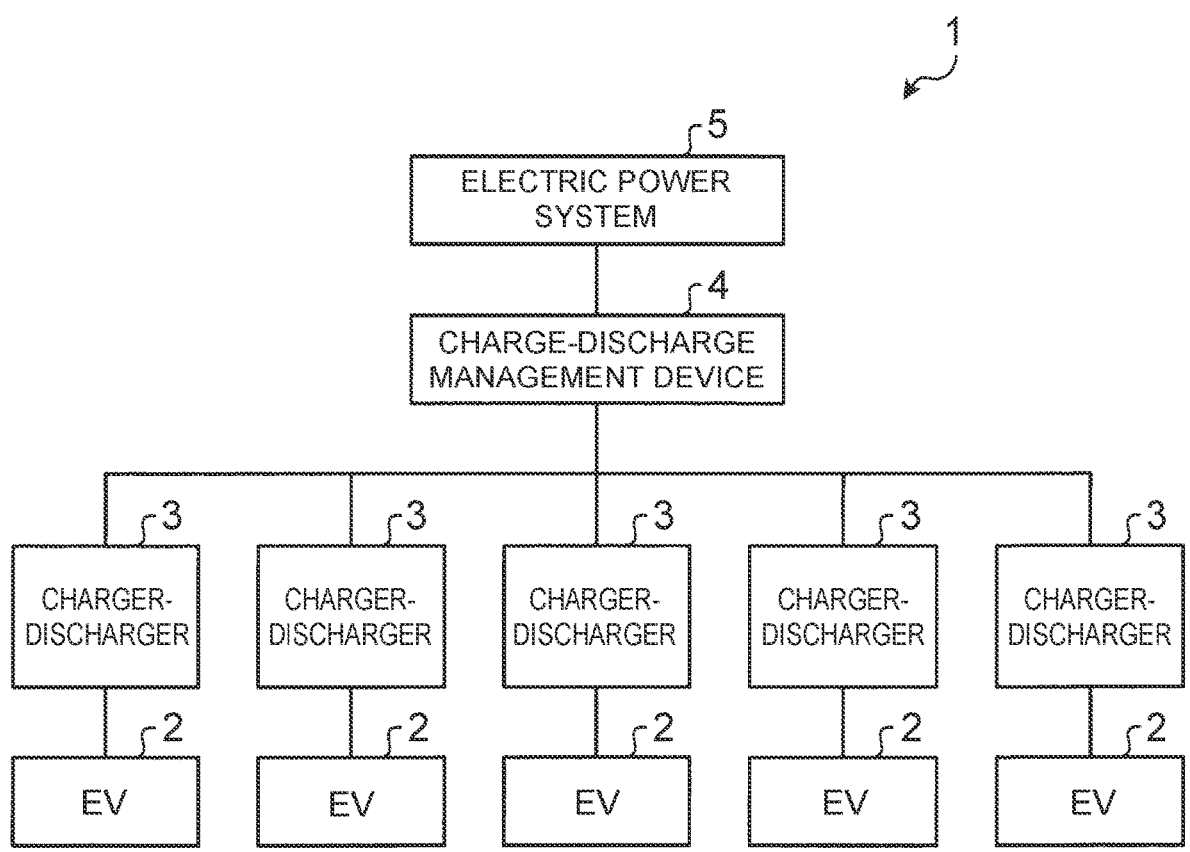
FIG. 1 is a schematic diagram showing the configuration of a charge-discharge management system that is an embodiment of the present disclosure.

FIG. 1 is a schematic diagram showing the configuration of the charge-discharge management system that is an embodiment of the present disclosure. As shown in FIG. 1, a charge-discharge management system 1 that is an embodiment of the present disclosure is a system that manages charging and discharging actions of storage batteries of a plurality of electric vehicles 2 retained by an electric vehicle (EV) station, and includes, as main constituent elements, the electric vehicles (EVs) 2, a plurality of charger-dischargers 3, and a charge-discharge management device 4. The charge-discharge management system 1 can be applied to a service of renting or sharing electric vehicles, a service of managing electric vehicles on a housing-complex basis, a virtual power plant service using the storage batteries of electric vehicles, and other services.

The electric vehicles 2 each have a chargeable-dischargeable storage battery, and are owned (or managed) by a consumer who manages the EV station. The storage battery of each electric vehicle 2 is configured such that electricity of the storage battery can be exchanged with another electric vehicle 2, i.e., inter-vehicle charge and discharge can be performed, through the charger-discharger 3. While the electric vehicles 2 are used in this embodiment, the scope of application of the present disclosure is not limited to the electric vehicles 2; any vehicles equipped with a chargeable-dischargeable storage battery, for example, hybrid vehicles (HVs) or plug-in hybrid vehicles (PHVs), may also be used.

The charger-discharger 3 is provided for each electric vehicle 2, and charges and discharges the storage battery of the electric vehicle 2 connected to the charger-discharger 3 in accordance with a control signal from the charge-discharge management device 4. While the charger-discharger 3 is provided for each electric vehicle 2 in this embodiment, a plurality of electric vehicles 2 may be connected to one charger-discharger 3.

The charge-discharge management device 4 controls charging and discharging actions of the storage batteries of the electric vehicles 2 by controlling the charger-dischargers 3, and exchanges electricity with an electric power system 5 through an EV station grid.

In the charge-discharge management system 1 having such a configuration, the charge-discharge management device 4 executes a charge-discharge plan creating process shown below to thereby increase the profit of the consumer who manages the charge-discharge management system 1. In the following, an operation of the charge-discharge management device 4 when executing the charge-discharge plan creating process will be described with reference to the flowchart of FIG. 2.

Charge-Discharge Plan Creating Process

Figure 2:
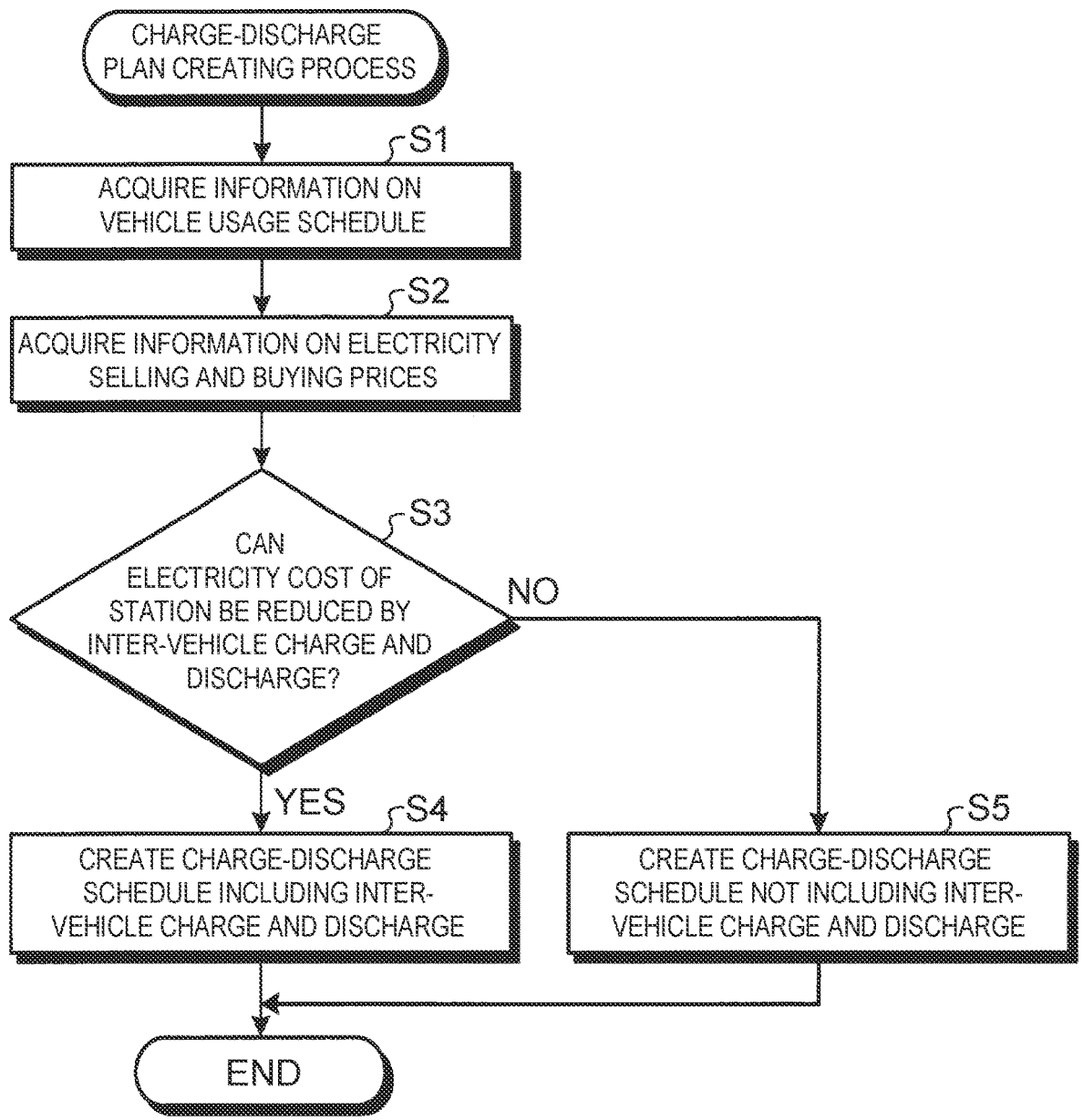
FIG. 2 is a flowchart showing the flow of a charge-discharge plan creating process that is an embodiment of the present disclosure.

FIG. 2 is a flowchart showing the flow of the charge-discharge plan creating process that is an embodiment of the present disclosure. At a timing when a command to execute the charge-discharge plan creating process is input into the charge-discharge management device 4, the flowchart shown in FIG. 2 is started and the flow of the charge-discharge plan creating process moves to the process of step S1.

In the process of step S1, the charge-discharge management device 4 acquires information on a usage schedule of the electric vehicles 2 connected to the charger-dischargers 3, such as the starting date and time of usage of the electric vehicles 2. The usage schedule information may be acquired from a database in which users of the electric vehicles 2 have registered the usage schedule information in advance, or may be inferred from a usage history of the user of each electric vehicle 2 (e.g., the user uses the electric vehicle 2 during morning hours on weekdays). Thus, the process of step S1 is completed, and the flow of the charge-discharge plan creating process moves to step S2.

In the process of step S2, the charge-discharge management device 4 communicates with an electric power company for information and thereby acquires information on an electricity selling price and an electricity buying price (information on electricity selling and buying prices) that fluctuate dynamically according to a demand and supply status of the electric power system 5. Thus, the process of step S2 is completed, and the flow of the charge-discharge plan creating process moves to step S3.

In the process of step S3, by using the information acquired by the processes of step S1 and step S2, and previously acquired information on the state and performance of the storage battery (the current capacity, full-charge capacity, upper-limit charge power, instantaneous charge power, upper-limit discharge power, instantaneous discharge power, etc.) of each electric vehicle 2 connected to the charger-discharger 3, the charge-discharge management device 4 determines whether or not a period covered by the charge-discharge plan to be created includes a period in which the electricity cost of the EV station can be reduced by inter-vehicle charge and discharge. When there is a period in which the electricity cost of the EV station can be reduced by inter-vehicle charge and discharge (step S3: Yes), the charge-discharge management device 4 creates a storage battery charge-discharge schedule including actions of charging and discharging the storage batteries by inter-vehicle charge and discharge (step S4). Specifically, the charge-discharge management device 4 creates a storage battery charge-discharge schedule in which the charging action of the storage batteries is switched between an action of charging the storage batteries by the charger-dischargers 3 and an action of charging the storage batteries by inter-vehicle charge and discharge, according to the electricity buying price acquired from the electric power company. On the other hand, when there is no period in which the electricity cost of the EV station can be reduced by inter-vehicle charge and discharge (step S3: No), the charge-discharge management device 4 creates a storage battery charge-discharge schedule that does not include actions of charging and discharging the storage batteries by inter-vehicle charge and discharge (step S5). Thereafter, the charge-discharge management device 4 charges and discharges the storage batteries by controlling the charger-dischargers 3 in accordance with the charge-discharge schedule.

More specifically, in the processes of step S3 to step S5, the charge-discharge management device 4 solves the problem of minimizing an electricity selling and buying cost C (the price of electricity bought from the electric power company–the price of electricity sold to the electric power company) of the EV station, expressed by the following Formula (1), in the period covered by the charge-discharge plan created (time t=start to end), while meeting restrictive conditions expressed by the following Formulae (2) to (7).

$$C = \int_{start}^{end} (Pb * Pgin - Ps * Pgout) dt \quad (1)$$

$$Ec\_i(\tau\_i) = 1 \quad (2)$$

$$Pgin = \sum_{1}^{n} (Pi\_i - Po\_i) \quad (3)$$

$$Pgout = \sum_{1}^{n} (Po\_i - Pi\_i) \quad (4)$$

$$0 \leq Pi\_i \leq PiMax\_in \quad (5)$$

$$0 \leq Po\_i \leq PoMax\_i \quad (6)$$

$$0 \leq Emax\_i * Ec\_i + \int_{0}^{t} (Pi\_i - Po\_i) dt \leq Emax\_i \quad (7)$$

Here, in Formulae (1) to (7), Pb is an electricity buying price [yen/kWh]; Ps is an electricity selling price [yen/kWh]; Pgin is power (≥0) [kW] charged to the EV station grid; Pgout is power (≥0) [kW] discharged from the EV station grid; i (=1 to n) is a unique identifier for distinguishing n electric vehicles 2 from one another; τ_i is time (t) to hand over an i-th electric vehicle 2; Ec_i is a state-of-charge (current capacity/full-charge capacity) [-] of the i-th electric vehicle 2; Pi_i is instantaneous charge power (≥0) [kW] of the i-th electric vehicle 2; Po_i is instantaneous discharge power (≥0) [kW] of the i-th electric vehicle 2; PiMax_i is upper-limit charge power (≥0) [kW] of the i-th electric vehicle 2; PMaxo_i is upper-limit discharge power (≥0) [kW] of the i-th electric vehicle 2; and Emax_i is a full-charge capacity [kWh] of the i-th electric vehicle 2.

The electricity buying price Pb, electricity selling price Ps, charge power Pgin, discharge power Pgout, instantaneous charge power Pi_i, and instantaneous discharge power Po_i are functions of time. The restrictive condition expressed by Formula (2) is a restriction that the state-of-charge at the time to hand over the electric vehicle 2 should be 100% (not limited to 100%). The restrictive condition expressed by Formula (3) is a restriction that the power Pgin charged to the EV station grid should be the sum of differences between the instantaneous charge power Pi_i and the instantaneous discharge power Po_i of all the electric vehicles 2. The restrictive condition expressed by Formula (4) is a restriction that the power Pgout discharged from the EV station grid should be the sum of differences between the instantaneous discharge power Po_i and the instantaneous charge power Pi_i of all the electric vehicles 2. The restrictive condition expressed by Formula (5) is a restriction that the instantaneous charge power Pi_i should not be larger than the upper-limit charge power PiMax_i. The restrictive condition expressed by Formula (6) is a restriction that the instantaneous discharge power Po_i should not be larger than the upper-limit discharge power PoMax_i. The restrictive condition expressed by Formula (7) is a restriction that the capacity of the storage battery remaining after the storage battery is charged or discharged from the current capacity should not be smaller than zero nor larger than the full-charge capacity Emax_i.

By solving the problem of minimizing the electricity selling and buying cost C of the EV station expressed by Formula (1), the charge-discharge management device 4 can create a charge-discharge schedule of the storage batteries of the electric vehicles 2 that can minimize the electricity cost of the EV station in the period covered by the charge-discharge plan created.

As has been clarified by the above description, in the charge-discharge management system 1 that is an embodiment of the present disclosure, the charge-discharge management device 4 switches, according to an electricity buying price, the charging action of the storage batteries between the action of charging the storage batteries by the charger-dischargers 3 and the action of charging the storage batteries by inter-vehicle charge and discharge. Thus, this system can reduce the electricity cost of the EV station and increase the profit of the consumer.

The charge-discharge management device 4 may discharge the electricity of the storage batteries to the electric power system by controlling the charger-dischargers 3 according to the electricity buying price and/or the electricity selling price. This configuration can further increase the profit of the consumer, for example, by discharging the electricity of the storage batteries to the electric power system when the electricity selling price is high.

In an example, charge-discharge schedules of three electric vehicles for a period covered by a charge-discharge plan created (24 hours (from 0:00 to 0:00 the next day)) were created under the preconditions (1) to (7) listed below, for the following four cases: a case where electricity was continuously charged from the start of control until the storage batteries of the electric vehicles were fully charged (calculation pattern 1); a case where electricity was charged exclusively during hours when the electricity buying price was low (calculation pattern 2); a case where, in addition to the actions of the calculation pattern 2, inter-vehicle charge and discharge was performed (calculation pattern 3); and a case where, in addition to the actions of the calculation pattern 3, electricity was discharged exclusively during hours when the electricity selling price was high (calculation pattern 4).

(1) The charge-discharge powers of the storage batteries were equal at 6 [kW].

(2) The full-charge capacities of the storage batteries were equal at 60 [kWh].

(3) The initial capacities of the storage batteries of electric vehicles No. 1, 2, and 3 were 45, 30, and 50 [kWh], respectively.

(4) The electric vehicles were returned at 9:00 and then control was started.

(5) The electric vehicles No. 1 and No. 2 were handed over at 12:00 and 15:00, respectively, and these electric vehicles were freed from control after hand-over.

(6) Not scheduled to be handed over, the electric vehicle No. 3 was fully charged by 24:00 before standing by.

Figure 3:
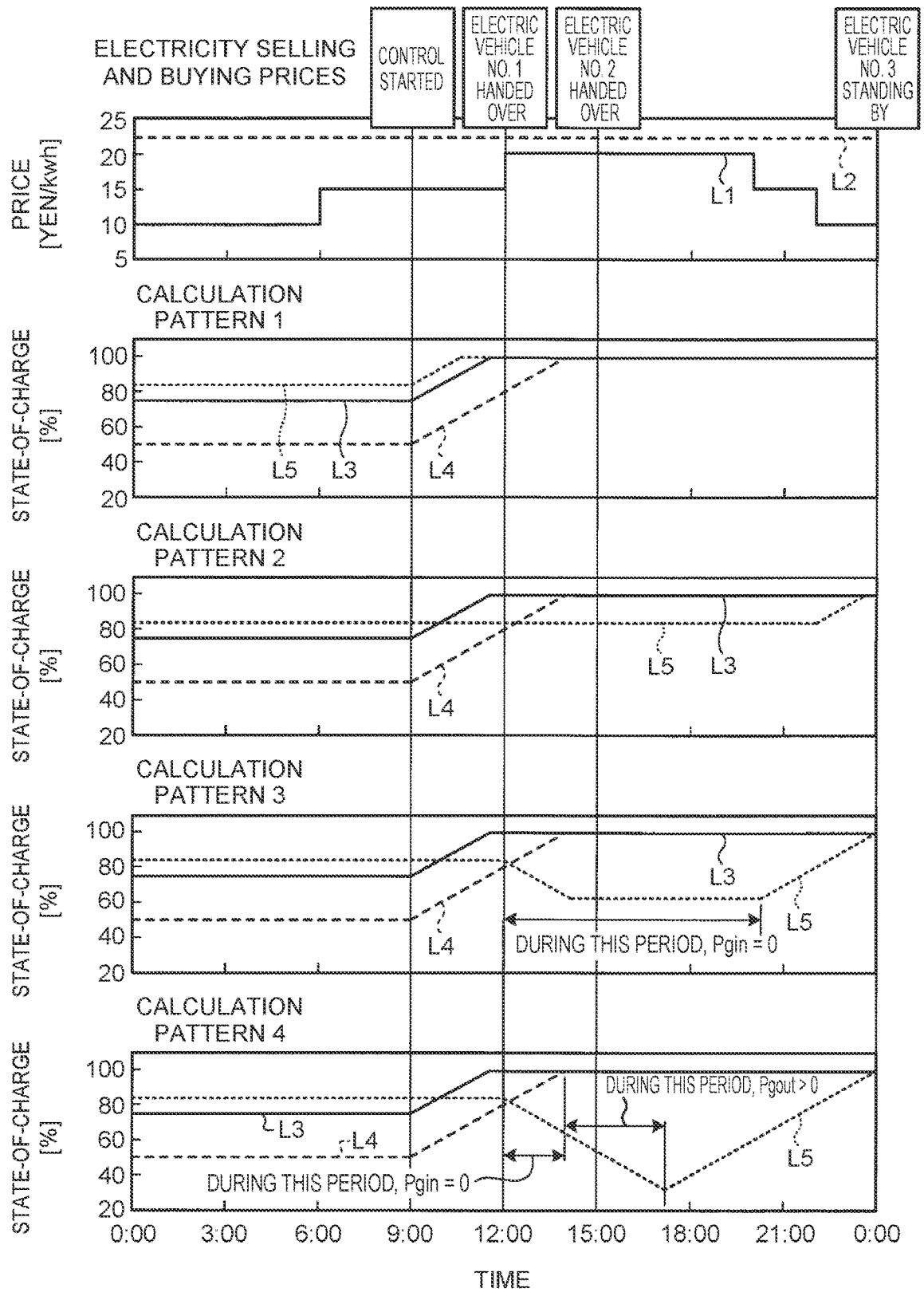
FIG. 3 is a chart showing changes in an electricity selling price and an electricity buying price, and charge-discharge schedules of storage batteries of electric vehicles in calculation patterns 1 to 4.

(7) The electricity selling price and the electricity buying price changed with time as shown in FIG. 3 (dynamic pricing).

Figure 4:
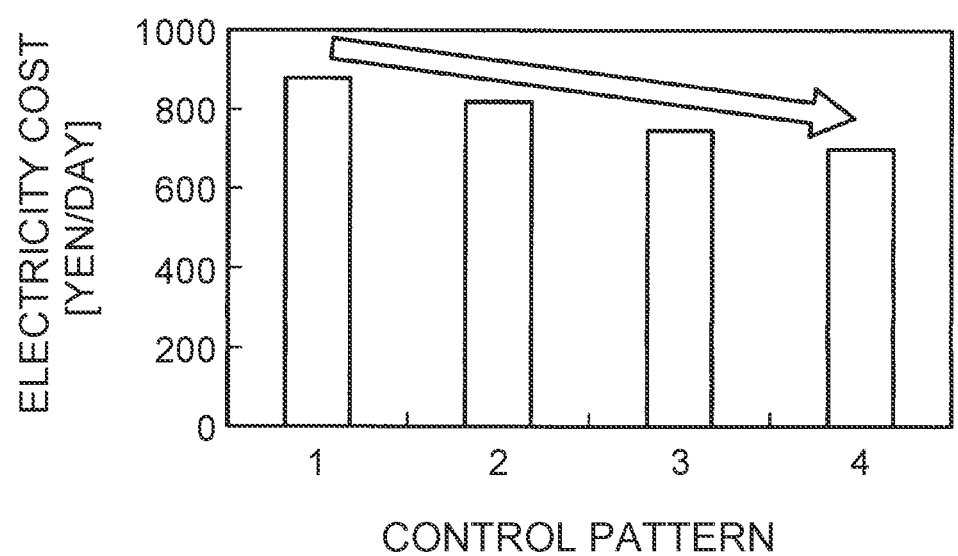
FIG. 4 is a graph showing electricity costs in control patterns 1 to 4.

FIG. 3 is a chart showing changes in the electricity selling price and the electricity buying price, and the charge-discharge schedules of the storage batteries of the electric vehicles in the calculation patterns 1 to 4. FIG. 4 is a graph showing the electricity costs in cases (control patterns 1 to 4) where charge and discharge of the storage batteries of the electric vehicles were controlled in accordance with the charge-discharge schedules of the calculation patterns 1 to 4. In FIG. 3, lines L1 to L5 respectively represent the electricity buying price, the electricity selling price, the charge-discharge schedule of the storage battery of the electric vehicle No. 1, the charge-discharge schedule of the storage battery of the electric vehicle No. 2, and the charge-discharge schedule of the storage battery of the electric vehicle No. 3.

As shown in FIG. 3, in the calculation pattern 1, the storage batteries of the electric vehicles started to be charged as soon as control was started, and control was completed at a timing when the states-of-charge of the storage batteries of the electric vehicles became 100%. As shown in FIG. 3, in the calculation pattern 2, by contrast, the storage batteries of the electric vehicles No. 1 and No. 2 started to be charged as soon as control was started, while the storage battery of the electric vehicle No. 3, which was not scheduled to be handed over and had only to be fully charged by 24:00 before standing by, is charged during the period from 22:00 to 0:00 the next day when the electricity buying price was lowest. Thus, as shown in FIG. 4, the control pattern 2 based on the calculation pattern 2 achieved a larger reduction in the electricity cost than the control pattern 1 based on the calculation pattern 1.

As shown in FIG. 3, in the calculation pattern 3, the power Pgin charged to the EV station grid was kept at zero during the period from 12:00 to 20:00 by performing inter-vehicle charge and discharge between the electric vehicles No. 1 and No. 2 and the electric vehicle No. 3, in addition to the actions of the calculation pattern 2. Thus, as shown in FIG. 4, the control pattern 3 based on the calculation pattern 3 achieved an even larger reduction in the electricity cost than the control pattern 2 based on the calculation pattern 2. As shown in FIG. 3, in the calculation pattern 4, the storage battery of the electric vehicle No. 3 was discharged and the discharged electricity was sold during the period from 14:00 to 17:00 when the electricity selling price was high, in addition to the actions of the calculation pattern 3. Thus, as shown in FIG. 4, the control pattern 4 based on the calculation pattern 4 achieved an even larger reduction in the electricity cost than the control pattern 3 based on the calculation pattern 3.

This result has confirmed that controlling charge and discharge of storage batteries of electric vehicles by using inter-vehicle charge and discharge according to the electricity buying price and/or the electricity selling price as in the present disclosure can increase the profit of the consumer.

While the embodiment to which the disclosure contrived by the present inventors is applied has been described above, the applicable embodiment is not limited by the description and the drawings that constitute part of the disclosure of the present disclosure based on the embodiment. For example, in the above embodiment, charge and discharge of the storage batteries of the electric vehicles are controlled according to the electricity buying price and/or the electricity selling price. Alternatively, charge and discharge of the storage batteries of the electric vehicles may be controlled according to a demand and supply status of an electric power company that does not necessarily appear in the price, such as the voltage, frequency, etc. of electricity supplied from the electric power company. Thus, the scope of the present disclosure includes all other embodiments, examples, operating techniques, etc. that are contrived by those skilled in the art based on the embodiment.

What is claimed is:

1. A charge-discharge management system comprising a plurality of electric vehicles wherein each of the electric vehicles has a storage battery, a charge-discharge facility that charges and discharges the storage batteries of the plurality of electric vehicles, and a charge-discharge management device that controls charging and discharging actions of the charge-discharge facility, wherein:

each electric vehicle of the plurality electric vehicles is configured to be able to exchange electricity of the storage battery of the electric vehicle of the plurality of electric vehicles with another electric vehicle of the plurality of electric vehicles through the charge-discharge facility; and the charge-discharge management device switches, according to an electricity buying price, a charging action of the storage batteries of the plurality of electric vehicles between an action of charging the storage batteries of the plurality of electric vehicles by the charge-discharge facility and an action of charging the storage batteries of the plurality of electric vehicles by exchanging electricity of the storage batteries of the plurality of electric vehicles between the plurality of electric vehicles.

2. The charge-discharge management system according to claim 1, wherein the charge-discharge management device discharges electricity of the storage batteries of the plurality of electric vehicles to an electric power system by controlling the charge-discharge facility according to an electricity buying price and/or an electricity selling price.

3. The charge-discharge management system according to claim 1, wherein the exchanging of electricity of the storage batteries of the plurality of electric vehicles between the plurality of electric vehicles includes charging a storage battery of a first electric vehicle of the plurality of vehicles using power supplied by discharging a storage battery of a second electric vehicle of the plurality of vehicles.

* * * * *